United States Patent
John et al.

(10) Patent No.: US 12,026,093 B1
(45) Date of Patent: Jul. 2, 2024

(54) SYSTEM AND METHOD FOR STORING AND ACCESSING PREPROCESSED DATA

(71) Applicant: Ceremorphic, Inc., San Jose, CA (US)

(72) Inventors: Lizy Kurian John, Austin, TX (US); Venkat Mattela, San Jose, CA (US); Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/883,249

(22) Filed: Aug. 8, 2022

(51) Int. Cl.
*G06F 12/08* (2016.01)
*G06F 12/0802* (2016.01)
*G06F 12/1009* (2016.01)

(52) U.S. Cl.
CPC ...... *G06F 12/0802* (2013.01); *G06F 12/1009* (2013.01); *G06F 2212/60* (2013.01)

(58) Field of Classification Search
CPC ............. G06F 12/0802; G06F 12/1009; G06F 2212/60

USPC ......................................................... 711/118
See application file for complete search history.

(56) References Cited

U.S. PATENT DOCUMENTS

| 11,360,669 | B2* | 6/2022 | Tsuruya | G06F 3/0608 |
| 2014/0359219 | A1* | 12/2014 | Evans | G06F 12/023 |
| | | | | 711/118 |
| 2019/0235762 | A1* | 8/2019 | Kaburaki | G06F 12/0864 |

* cited by examiner

*Primary Examiner* — Hua J Song
(74) *Attorney, Agent, or Firm* — File-EE-Patents.com; Jay A. Chesavage

(57) ABSTRACT

A data storage system has a CPU data bus for reading and writing data to data accelerators. Each data accelerator has a controller which receives the read and write requests and determines whether to read or write a local cache memory in preprocessed form or an attached accelerator memory which has greater size capacity based on entries in an address translation table (ATT) and saves data in a raw unprocessed form. The controller may also include an address translation table for mapping input addresses to memory addresses and indicating the presence of data in preprocessed form.

19 Claims, 9 Drawing Sheets

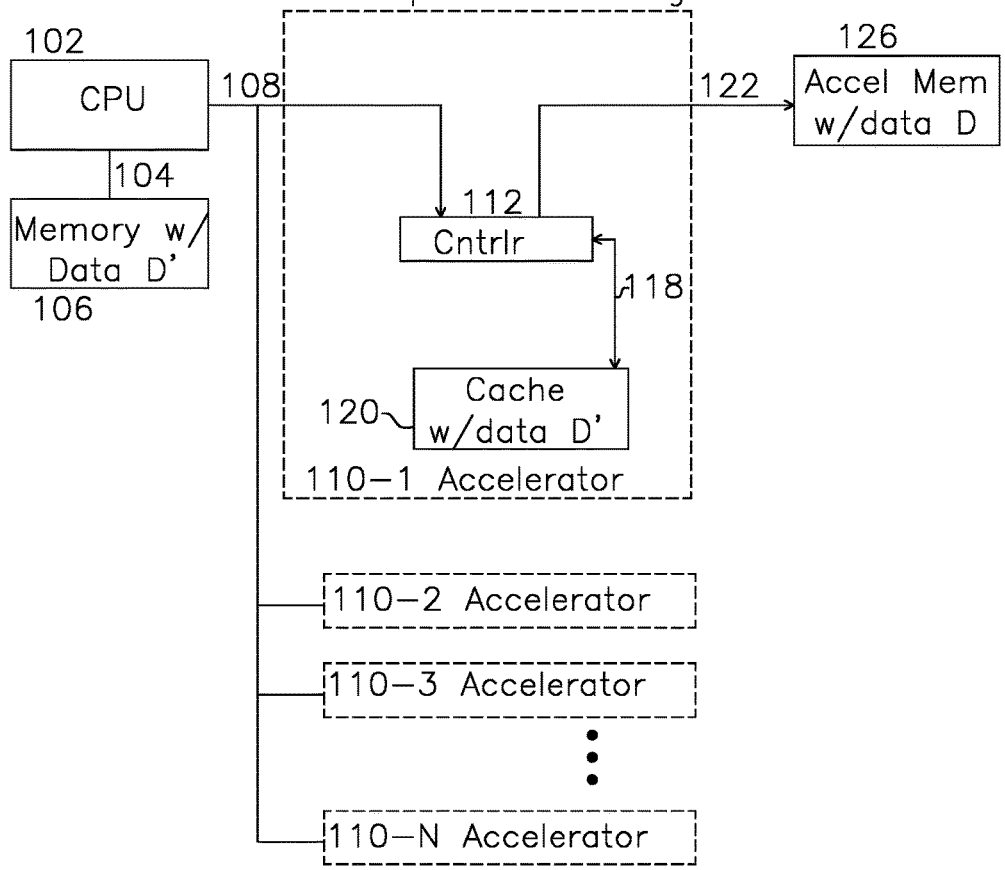

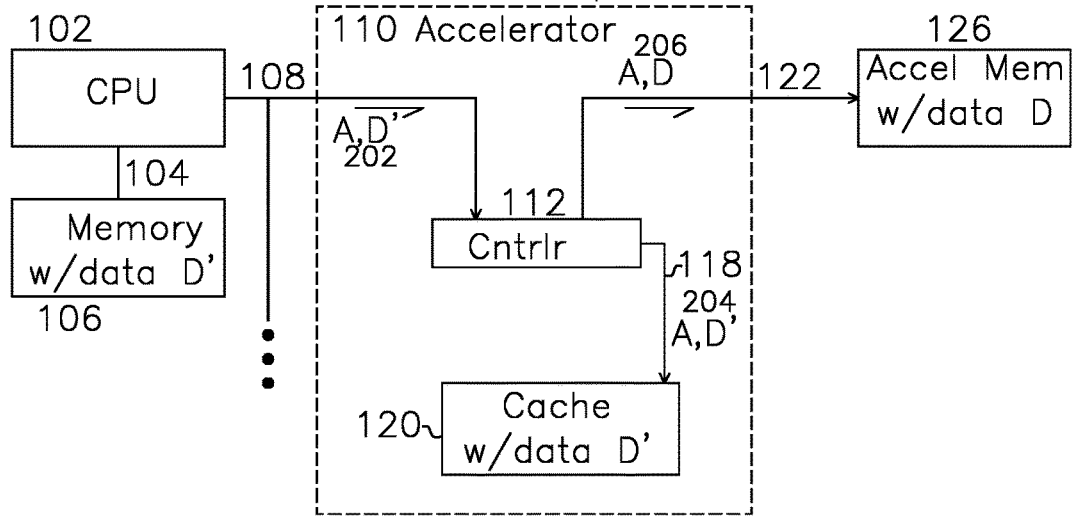
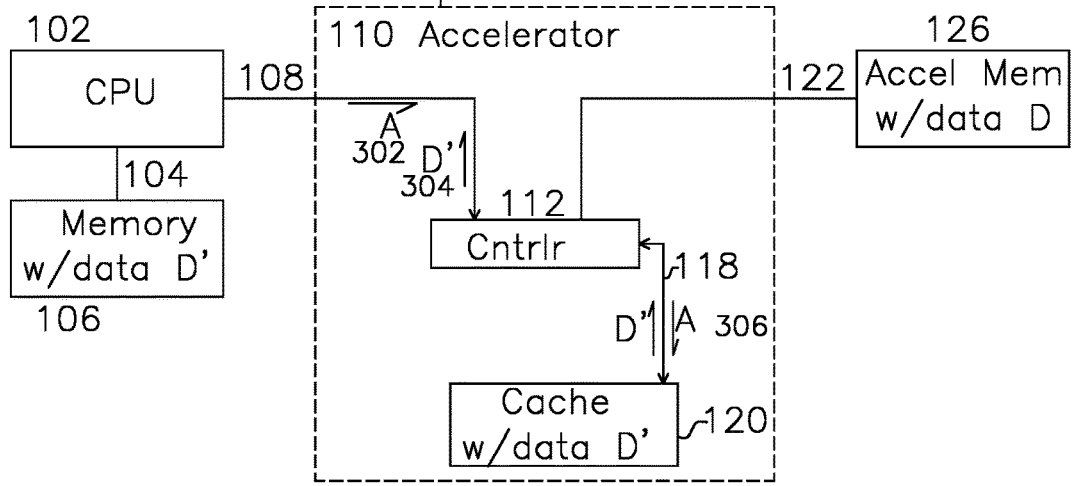
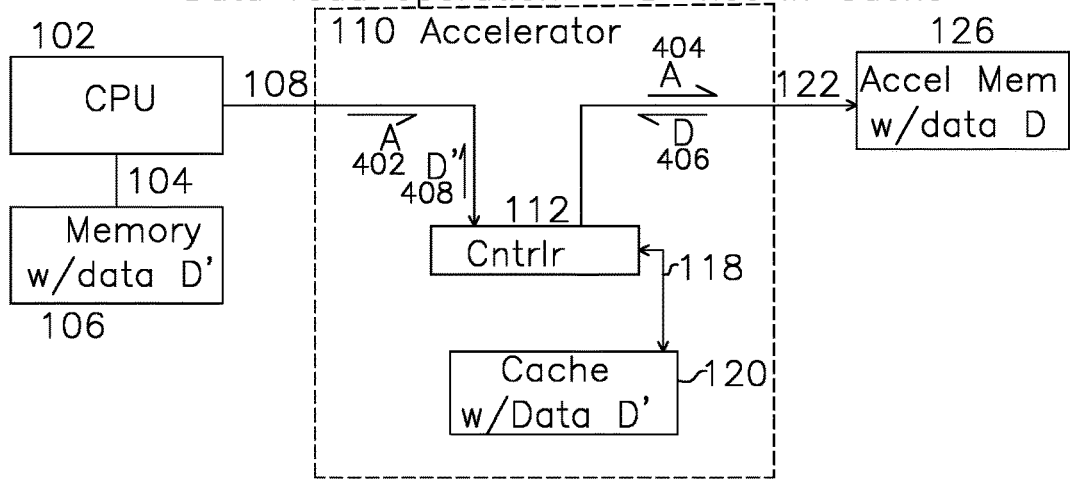

Data read operation — not in Cache + Radix/Format change

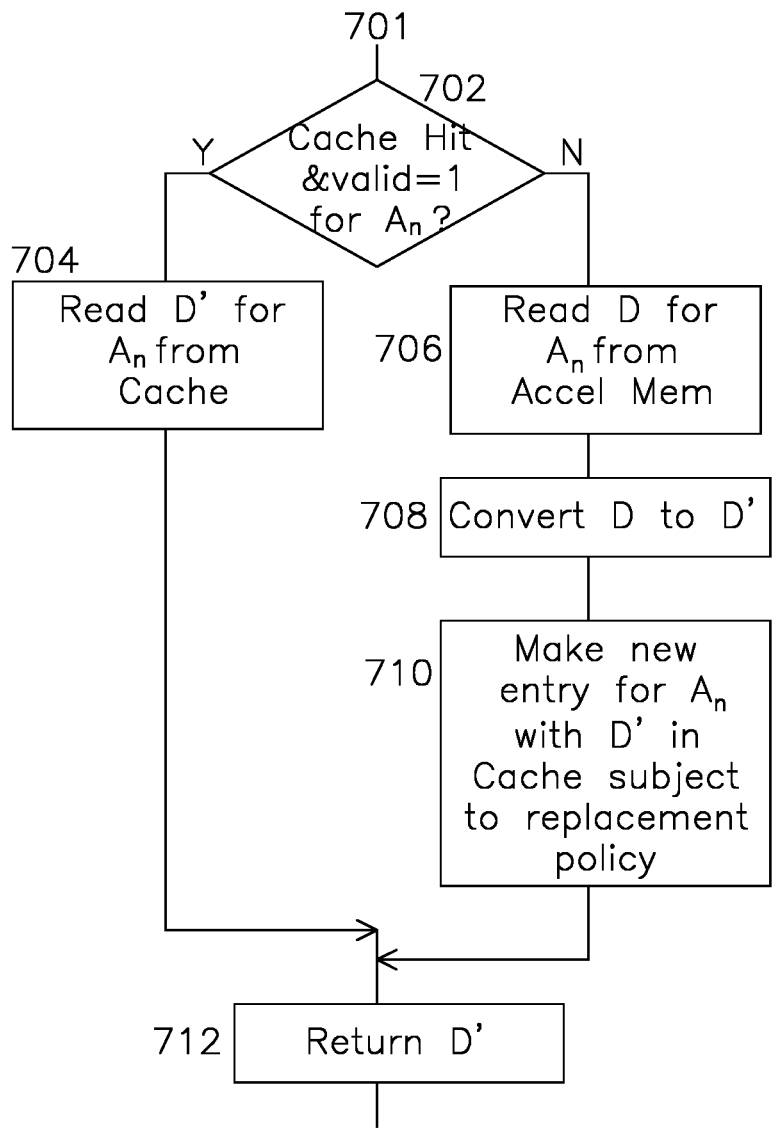

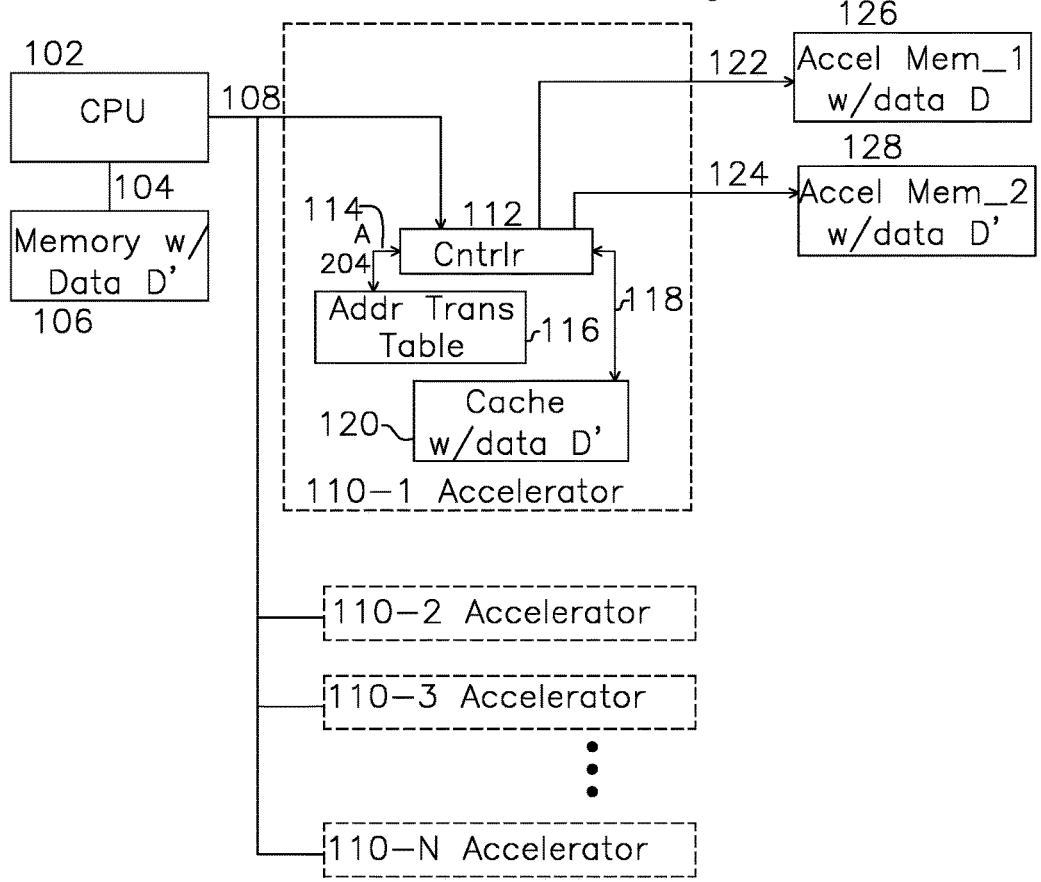

Figure 8D
602
| Inpt Addr | Cache Valid bit | Mem_2 Valid bit | Mem 2 address A' |
|---|---|---|---|
| A1 | 1 | 0 | -- |
| A2 | 0 | 1 | A2' |
| A3 | 1 | 0 | A3' |
| A4 | 0 | 1 | A4' |
| 0x10xxxx | 0 | 1 | 0x31xxxx |
604 606 607 610
614 — A4 row
612 — 0x10xxxx row
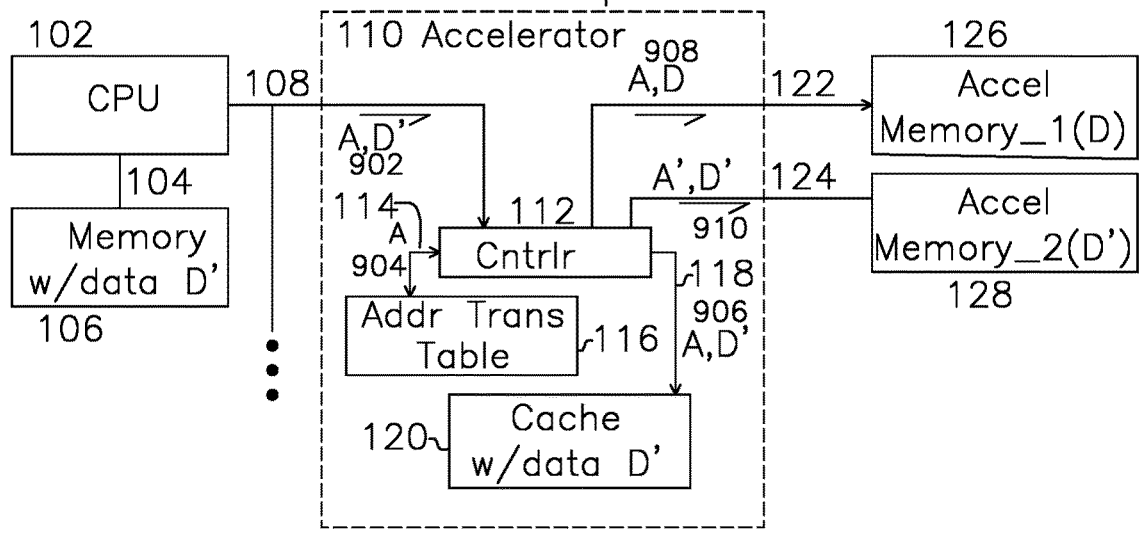
Figure 9
Data write operation
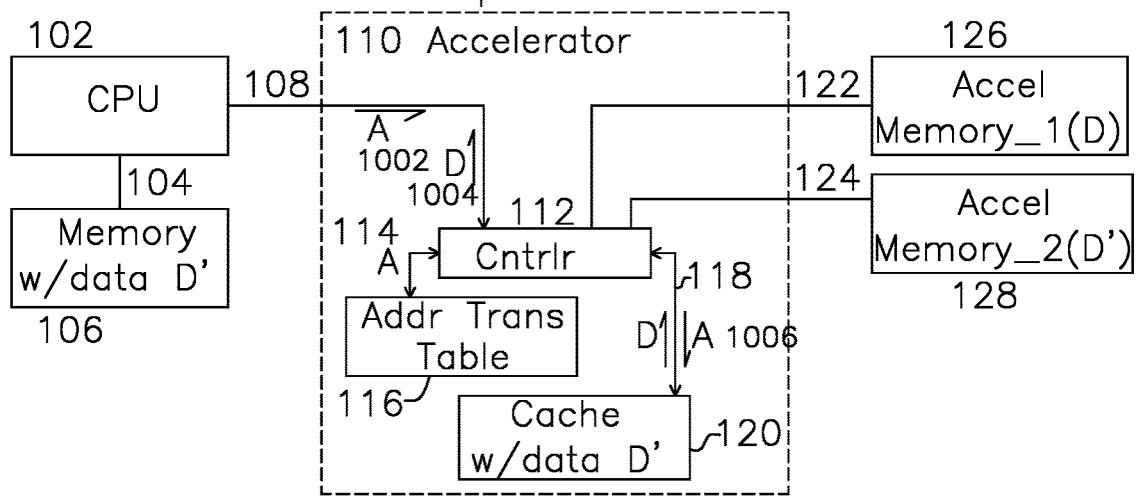
Figure 10
Data read operation — in cache Data read operation — not in Cache

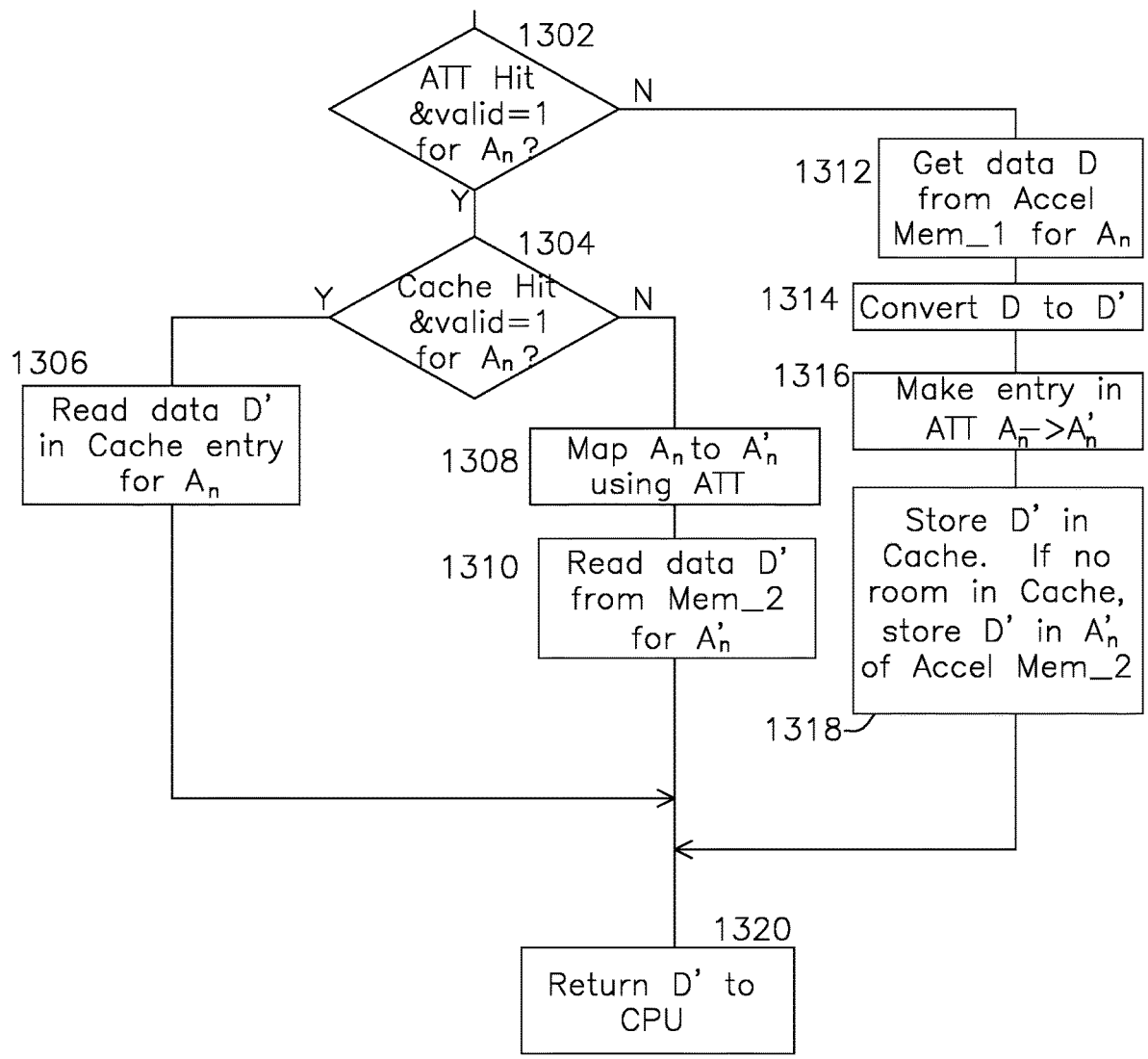

SYSTEM AND METHOD FOR STORING AND ACCESSING PREPROCESSED DATA

FIELD OF THE INVENTION

The present invention relates to an apparatus and method for storing and accessing preprocessed data D' in distributed computing, where data is initially delivered in a raw (unprocessed) form as data D, but is used in a preferred preprocessed or converted data D' form derived from the unprocessed data D before use.

BACKGROUND OF THE INVENTION

A problem of distributed computing is that a master set of information may be saved in one location, and subsets of that information periodically distributed to various elements of a distributed processing system. Each element of the distributed processing system operates on an associated subset of distribute data, some subsets of which may be distributed to more than one distributed processing system element.

Many applications perform preprocessing of data before the main compute step. In relational database applications, it might be beneficial to store indexed views of the data base tables with different indices. In many applications, the data may reside in memory in a particular number system or floating point format, but the actual compute unit may employ a different format. For example, numbers may be stored in POSIT format but computations may be done in a fixed point or floating point format. Other examples include a database where preprocessed data comprises names stored as an index into the database, or the same database using a zip code or address stored in preprocessed form as the index. Reusing converted data/preprocessed data can improve performance and avoid wasted work, and save energy. Examples of a relationship between unprocessed data D and preprocessed data D' include:
  a first number format to a second number format;
  a POSIT format to a different POSIT format;
  Java® code to machine opcode;
  uncompressed data to compressed data;
  uncompressed code to compressed code;
  compressed data to uncompressed data;
  compressed code to uncompressed code or
  a database with a first index to a database to a second index.

A problem is that usually the raw (unprocessed) data is what is shared and each node must perform the preprocessing. In a distributed computing environment, it is not necessary to perform the preprocessing by each compute node. The preprocessed information may be stored and reused by compute nodes. If each node has to subsequently preprocess the unprocessed data again, more computational resources are wasted. If one node has preprocessed the data, such as after use of an energy-intensive data manipulation process transforming unprocessed data into preprocessed data, the other nodes can benefit from reduced power consumption by having access to the preprocessed data rather than the raw (unprocessed) data.

It is desired to provide sharing of preprocessed data across the various elements of a distributed processing system.

It is desired to provide a system and method for sharing readily accessible preprocessed data while maintaining an source of raw data which may be converted to preprocessed data and stored in a local cache on a demand basis.

OBJECTS OF THE INVENTION

A first object of the invention is a storage accelerator comprising:
  a controller coupled to a requesting interface and receiving requests for preprocessed data from the requesting interface, the requests including an address;
  the controller also coupled to accelerator cache memory containing preprocessed data associated with a cache memory tag, the accelerator memory containing corresponding unprocessed data;
  the accelerator memory having greater storage capacity than the accelerator cache memory, the controller receiving memory read requests for preprocessed data from the requesting interface, the memory read request comprising at least one address, the controller first examining the cache memory for a cache memory tag matching at least part of the at least one address and returning data associated with the cache memory tag;
  when a cache memory tag matching at least one part of the address is not present, the controller subsequently examining the accelerator memory according to the at least one address and retrieving associated unprocessed data;
  the controller retrieving associated unprocessed data from the accelerator memory, converting the unprocessed data into preprocessed data, and returning the preprocessed data to the requesting interface.

A second object of the invention is a system comprising:
an accelerator first memory for preprocessed data and an accelerator second memory for unprocessed data, the accelerator first memory and accelerator second memory coupled to a controller;
the controller coupled to an interface requesting data associated with an address;
the controller also coupled to an accelerator cache memory containing preprocessed data;
the controller also coupled to an address translation table (ATT) having at least one entry, each entry comprising an input address, an accelerator second memory translated address, and an accelerator second memory valid bit;
the accelerator first memory and accelerator second memory having greater storage capacity than the cache memory;
the controller receiving memory read requests for preprocessed data from the interface, the memory read request comprising at least one address, the controller first examining the cache memory for a cache memory tag matching at least part of the at least one address and returning data associated with the cache memory tag;
when a cache memory tag matching at least part of the requested address is not present in the cache memory and the requested address matches an entry in the ATT for an accelerator second memory output address and with an accelerator second memory valid bit asserted, the controller subsequently examining the accelerator second memory according to a translated at least one address from the ATT, retrieving associated preprocessed data from the accelerator second memory, and returning the associated preprocessed data to the CPU;
when a tag matching at least one part of the address is not present in the cache and the requested address does not match an entry in the ATT for an accelerator second memory address with an accelerator second memory valid bit asserted, the controller subsequently examining the accelerator first memory according to a translated at least one address, retrieving associated unprocessed data, converting the unprocessed data to preprocessed data, and returning the preprocessed data to the interface.

SUMMARY OF THE INVENTION

The present invention provides a method and apparatus for storing unprocessed (raw) data in a first location and maintaining a subset of preprocessed (converted) data which is derived from the unprocessed data. In one example of the invention, the raw unprocessed data comprises IEEE floating point data stored in an accelerator memory, and the preprocessed data comprises data that has been converted from floating point data to integer, POSIT, or variable precision data, and stored in an accelerator cache memory or storage memory, where the conversion from raw data to preprocessed data is performed by a chip or FPGA controller and maintains a cache memory of preprocessed data and a larger capacity accelerator memory containing unprocessed data which can be converted to pre-processed data on demand but uses controller computational resources to perform the conversion. In another example embodiment, an address translation table is used to convert an incoming request for data from an input address to a second accelerator memory storing preprocessed data and which supplements the cache memory.

In an example embodiment, a data storage system is coupled to a data interface bus providing data read and data write requests such as from a CPU, the data storage system including:
an accelerator having:
a controller receiving data read requests for preprocessed data and accompanied by an address, or the controller receiving unprocessed data write requests accompanied by an address and unprocessed data, the controller coupled to each of:
a cache memory containing preprocessed data accessed by a tag derived from the address;
an accelerator memory containing unprocessed data accessible by the address.

When the controller receives a write request accompanied by preprocessed data, the controller writes the preprocessed data to the accelerator memory and optionally also stores the preprocessed data in the cache memory accompanied by a tag derived from the address, as is known for cache memory.

When the controller receives a read request accompanied by an address, the controller generates a tag derived from the read request address and checks the cache memory for preprocessed data matching the tag. If a valid flag for the preprocessed data matching the tag is found, then the preprocessed data is returned. If no matching tag is found in the cache memory, the controller issues a read request to the accelerator memory containing unprocessed data, the unprocessed data from the accelerator memory is read, converted to preprocessed data, and returned to the requestor.

In a second example embodiment of the invention, an accelerator has a controller receiving data read requests for preprocessed data, the read request accompanied by an address, or alternatively, the controller receiving unprocessed data write requests accompanied by an address and unprocessed data, the controller coupled to each of:
a cache memory containing preprocessed data accessed by a tag derived from the address;
an accelerator first memory containing unprocessed data accessible by the request address;
an accelerator second memory containing preprocessed data accessible by the request address;
an address translation table (ATT) containing entries, each entry having an association between an address and an accelerator second memory address accompanied by an accelerator second memory valid bit.

When the controller receives a write request accompanied by unprocessed data, the controller writes the unprocessed data to the accelerator first memory and optionally also converts the unprocessed data to preprocessed data and stores the preprocessed data in the cache memory accompanied by a tag derived from the address, as was described previously. The controller may also store the preprocessed data into the accelerator second memory and provide an entry into the ATT referencing the stored preprocessed data.

When the controller receives a read request accompanied by an address on an interface, the controller generates a tag derived from the address and checks the cache memory for preprocessed data matching the tag. If preprocessed data matching the tag is found, then the preprocessed data is returned. If no matching tag is found in the cache memory, then the controller checks the ATT for an entry for the accelerator second memory having a matching input address, and if one is found, associated data from the accelerator second memory referenced by the ATT is retrieved from the accelerator second memory and returned to the requesting interface. If an entry in the accelerator second memory is not found matching the input address, then the read request address is provided to the accelerator first memory, and unprocessed data from the accelerator first memory corresponding to the input address is converted to preprocessed data and returned to the requesting interface.

The ATT of the second embodiment of the invention provides a correspondence between an input address and preprocessed data held in the accelerator second memory, and optionally an indication that the data is either not available or not valid in the cache memory, as well as a directly addressable first memory which contains unprocessed data, which can be retrieved and converted to preprocessed data before being transmitted to the requesting interface.

BRIEF DESCRIPTION OF THE DRAWINGS

FIG. 1A is a block diagram of a data storage architecture comprising a CPU with CPU memory coupled to a plurality of accelerators.

FIG. 1B shows example Cache memory entries for FIG. 1A.

FIG. 1C shows example accelerator memory entries for FIG. 1A.

FIG. 2 is a block diagram of a data write operation in one of the accelerators.

FIG. 3 is a block diagram of a data read operation in one of the accelerators where corresponding preprocessed data is available in cache memory.

FIG. 4 is a block diagram of a data read operation in one of the accelerators where corresponding preprocessed data is not available in accelerator cache memory.

FIG. 7 shows a flowchart for an example read operation for the system of FIG. 1A.

FIG. 8A shows a block diagram for a data storage architecture with a second memory containing preprocessed data and addressable by an address translation table (ATT).

FIG. 8B shows an arrangement of cache memory for the system of FIG. 8A.

FIG. 8C shows example first acceleration memory configuration for the system of FIG. 8A.

FIG. 8D shows an example set of entries for an address translation table.

FIG. 9 shows an example write operation for the system of FIG. 8A.

FIG. 10 shows an example read operation for the system of FIG. 8A where the requested data is in the cache memory.

FIG. 13 shows an example flowchart for reading data in the system of FIG. 8A.

DETAILED DESCRIPTION OF THE INVENTION

Figure 5:
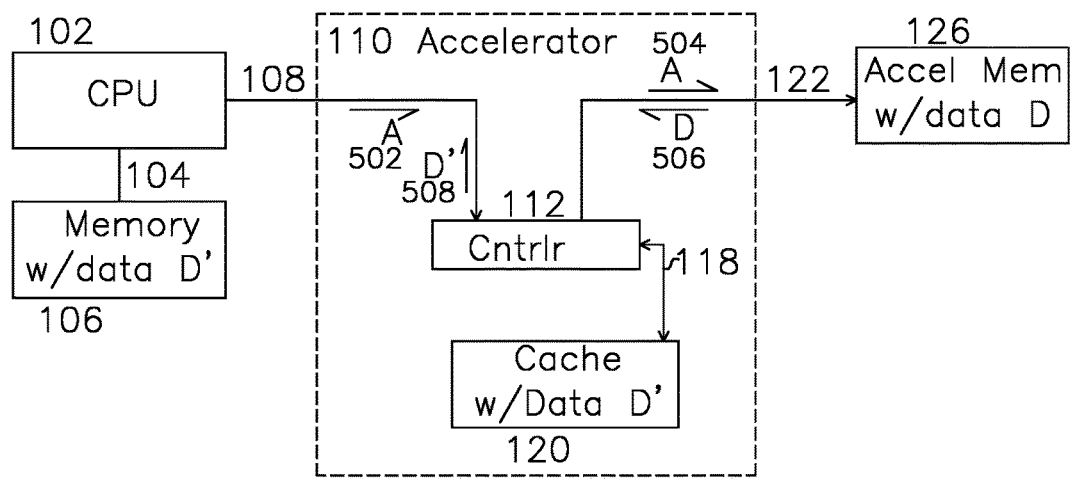
FIG. 5 is a block diagram of a data read operation in one of the accelerators where a data conversion is necessary.

By way of convention, raw unprocessed data is referenced in the specification and drawings as unprocessed data D, and preprocessed data D' is data which has been converted from unprocessed data to be in a preferred usable form by the CPU or requesting interface. In general, the Cache memory 120 maintains preprocessed data D', which is suitable for instant use, and acceleration memory 126 stores unprocessed data D as shown in FIG. 1A. Where greater storage of preprocessed data D' is needed, an accelerator second memory such as 128 of FIG. 8A may be used, as will be explained.

In the present specification and drawings, same reference numbers refer to the same structure or function as shown in other views.

FIG. 1A shows a block diagram for a system providing storage and retrieval of preprocessed data in an example distributed processor system using one or more accelerators 110. One or more CPUs 102 is coupled to a memory 106, such as through a data bus 108, which may be a bi-directional data interface bus (or interface) such as the well-known peripheral component interface (PCI) data bus or other data communications bus suitable for reading and writing data to a device such as accelerator 110-1, 110-2, 110-3, through 110-N, each of which may be individually referred to as an accelerator 110. Examples of other high speed data interface communication protocols include CXL (Compute Express Link, as described in http://en.wikipedia.org/wiki/Compute_Express_Link), PCI Express (PCIe as described in pcisig.com), or any of the many prior art data transfer protocols without limitation. Each accelerator 110 comprises a controller 112 receiving and processing memory requests, including memory write requests comprising an address associated with write data, and memory read requests comprising an address associated with previously written data. In a first example transaction, the CPU writes preprocessed data D' from memory 106 which is converted to unprocessed data D and stored as data D in accelerator memory 126. In a second example transaction, the CPU 102 writes unprocessed data D to controller 112 which writes the unprocessed data D to accelerator memory 126. When reading data, the controller 112 is coupled to cache memory 120 containing preprocessed data D' which is addressable by a tag derived or extracted from the read address. In one example of the invention where the word length stored in the cache memory is 4 bytes and the cache tag is the address but with the least significant 2 bits removed, then input address 0x0003 (16 bits) (0x representing hexadecimal notation) becomes 0x0000 (14 bits). The cache memory 120 after presentation with the tag either indicates that data associated with the tag is present in cache memory and valid (a cache hit), or that the tag is not present (cache miss). In the case of a cache miss, the controller 112 sends the address to accelerator memory 126, which contains data in unprocessed form D. The unprocessed data D is returned to the controller 112, which processes the data to form preprocessed data D', and returns the preprocessed data D' to the requestor via data bus 108. Optionally, the preprocessed data D' is stored in the cache memory 120 with an associated tag (such as the most significant 14 bits of a 16 bit address for 32 bit data and byte-level addressing).

FIG. 1B shows an example cache memory 120, where each entry corresponds to a location in the memory indicated by "Cache addr", and each entry such as 152A comprises a tag value, block data associated with the tag, and a valid bit indicating the entry has not aged out, or is otherwise invalid and should not be used. In the present case, for simplicity, the input address and cache tag will be assumed to be of equal length, and the block data delivered as 32 bit data words rather than byte data. Address 0x0000 is the same as tag 0x0000 with associated data 0x9AB213978 as shown. Cache memory has content addressable features, such that when an address tag is applied as an input, all of the tag values in the first column of FIG. 8B are compared to the address tag, and the matching tag with a valid bit asserts the associated output block data 0x9AB21397. Similarly, address 0x0004 is associated with the block data of entry 154A. The data stored in cache 120 is preprocessed data. Cache memory architectures are well known in the art and involve tradeoff between complexity and speed. Examples of cache architectures include direct mapped cache and n-way set associative cache, and in one example of the invention, the cache may be 2-way set associative cache.

Considering a trivial example where the preprocessed data is simply the is complement of the unprocessed data, FIG. 1C shows example contents of accelerator memory 126 where the entry for address 0x0000 of cache memory 120 entry 152A corresponds to entry 152B of FIG. 1C, such that the complement of 0x9AB21397 is 0x654DEC68. In this illustrative example, a read request for 0x0000 results in a cache hit for preprocessed data, and the accelerator memory 126 is only retrieved (in unprocessed form), read, converted to preprocessed form, and returned to the interface if the cache entry for 0x0000 were replaced by a tag for a different address, or the valid bit for the entry were changed to not asserted such as 0. In a typical application, the preprocessed data D' is significantly more computationally demanding than a simple inversion of this example, such as a radix change or variable precision data conversion.

FIG. 2 shows the accelerator 110 during a data write operation, where a write address A and preprocessed data D' 202 are input to controller 112, which first examines the cache memory 120 for a tag match based on a tag extracted from the input address A. If a cache hit occurs, the preprocessed data D' is written to the corresponding location of cache memory corresponding to the tag, and if a cache miss occurs (the tag is not in the cache), then the preprocessed data D' is converted to unprocessed data D by the controller 112 and written to accelerator memory 126.

FIG. 3 shows a data read operation where the address A corresponds to a cache hit in cache memory 120, and cache 120 preprocessed data D' is returned by the controller 112 to the CPU 102.

FIG. 4 shows a data read operation, where a requested address A 402 is applied to controller 112, which first checks the cache memory 120 for an entry matching a tag formed from the address A as described previously. In this example, a cache miss occurs, and the controller 112 sends the address A 404 to the accelerator memory 122, which returns unprocessed data D 406 corresponding to the requested address. The unprocessed data D 406 is converted by controller 112 to preprocessed data D' 408, and delivered to the CPU 102. Since a cache miss occurred on a read operation, the preprocessed data D' may also be written into Cache memory 120, or one of the many data cache policies of the prior art employed to determine when data is maintained in cache memory or replaced.

FIG. 5 shows a read request with a cache miss similar to the illustration of FIG. 4, but where the request results in a data stream or a variable length sequence of processed data, such as a segment of decompressed data of zip file data, or Java® machine code, where an input address results in a variable length stream of preprocessed data. In this case, the request for a single address A 502 generates a cache miss in cache memory 120, as before, and the address is forwarded to accelerator memory 126, which returns unprocessed data D (such as compressed code or Java® machine code), and the controller 112 decompresses or translates the unprocessed data D into preprocessed data D' for return to the CPU and also stores the preprocessed data D' into cache 120 for faster subsequent access.

Figure 6:
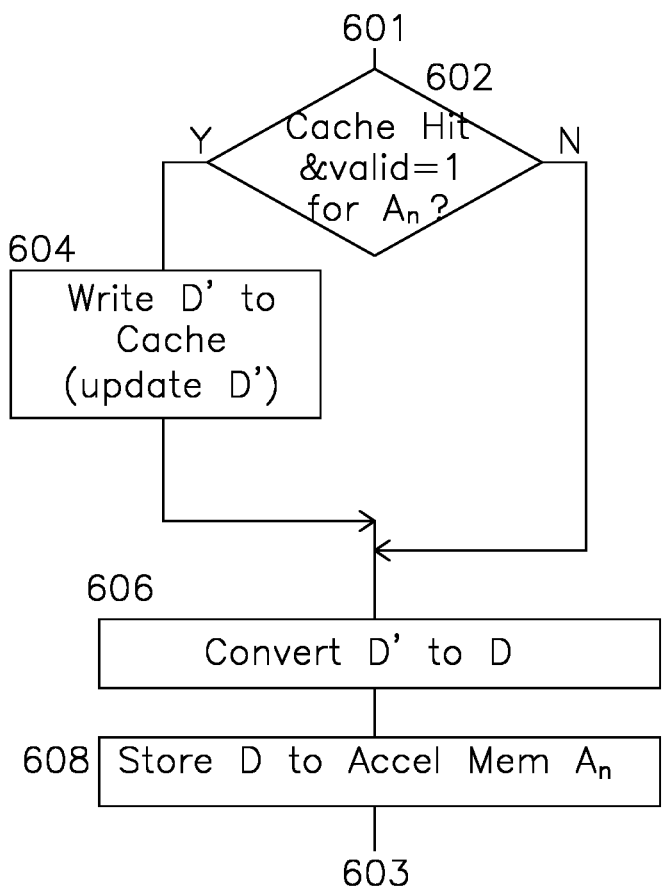
FIG. 6 shows a flowchart for an example write operation for the system of FIG. 1A.

FIGS. 6 and 7 are flowcharts for example write and read operations, respectively, in the various modes shown in FIGS. 1A to 4.

FIG. 6 shows an interface write request, such as a write request from CPU 102. Preprocessed data D' from the CPU 102 is written to an address An using data bus 108 of FIG. 1A. Step 602 checks for a cache hit for An, and if the address is found in the cache memory, step 604 executes the overwriting of new preprocessed data D' into cache memory, and the preprocessed data D' is converted into unprocessed data in step 606 and written to accelerator memory 126 address An. If no cache hit occurs in step 602, the process proceeds to step 606. In one example of the invention, cache replacement of cached data does not occur on write operations unless the corresponding address is already found in cache in which case an update of the corresponding cache data occurs, since performance benefits and data storage policy is typically based on read operations, where frequency of access determines which data is cached for future read operations and performance improvements. The handling of data maintained in a cache is known as cache policy, which is well known in the art of memory cache and not included in the present description.

FIG. 7 shows a read operation flowchart. The input address An is applied to the controller 112, which checks for a cache hit with valid bit in cache memory 120 in step 702. If a cache hit occurs 704, the preprocessed data D' is read for the tag associated with An from cache memory 120, and in step 712 is returned to the CPU. If the address is not present in cache, then a cache miss has occurred, in which case the address An is applied to the accelerator memory 126 to return unprocessed data D in step 706, which is converted from unprocessed data D to preprocessed data D' in step 708, and returned to the CPU in step 712, optionally also making a new entry for An with preprocessed data D' in cache memory in step 710, according to a cache update/entry policy of the prior art. Any prior art cache replacement algorithm may be used to maintain the cache with recently accessible data, which is beyond the scope of the present discussion.

FIG. 8A shows an example of a dual format data storage architecture, which has similarities to the previously described architecture of FIG. 1A, but which provides expanded storage for preprocessed data D' in accelerator second memory 128 to supplement the limited storage capacity of cache memory 120. Controller 112 receives an input address A for a read operation, or an input address An accompanied by preprocessed data D' for a write operation. The controller 112 is coupled to an accelerator first memory 126 for storing unprocessed data D, and also to a cache memory 120 storing preprocessed data D' as before. Additionally, the controller is coupled to an accelerator second memory 128 for storage of preprocessed data D', and the controller is also coupled to an address translation table 116, which contains a plurality of entries for directing incoming requests for data accompanied by an address An to at least one of (in preferred order):

cache memory 120 if a cache hit occurs matching a cache address tag match;

the accelerator second memory 128 which contains preprocessed data D', if the ATT 116 indicates preprocessed data for An is available, or the accelerator first memory 126 containing unprocessed data D, requiring conversion to preprocessed data as was previously described for FIG. 1A. In operation, the request for data associated with address An passes first to the cache memory 120 containing preprocessed data D', and if a cache miss occurs, the request is made to the accelerator second memory 124 which is slower but has larger storage capacity than cache memory 120 and also contains pre-processed data D', and where accelerator second memory 124 is addressed using An' according to an entry in the address translation table 116. If preprocessed data D' is not available in the accelerator second memory 128, then the unprocessed data D is accessed in accelerator first memory using the original address A, as the accelerator first memory 126 is typically the largest capacity and contains all unprocessed data D addressable by An, but which requires conversion to preprocessed data as requested by An.

The address translation table 116 of FIG. 8A is shown in one example of the invention in FIG. 8D, and contains a plurality of entries, each entry having at least one of:

an input address value An for comparison with an address associated with a read or write request from the CPU;

a cache valid bit indicating an input address (or range of addresses) is available in cache memory;

second memory parameters including a second memory translated address (shown as A') and a second memory valid bit indicating valid preprocessed data is available for the input address may be found in the corresponding second memory address location. In one example of the invention, first memory (containing unprocessed data) is available for all addresses by direct address An, should the controller need to access unprocessed data when preprocessed data is not available in either the cache memory 120 or second memory 128, both of which contain preprocessed data in ready-to-use form and without requiring the conversion of unprocessed data stored in first memory 126 and associated conversion computation resources.

FIG. 8B shows example cache memory 120 data and FIG. 8C shows example first memory 126 data, as was shown for FIGS. 1B and 1C. FIG. 8D shows example entries in the address translation table (ATT) 116, which is used when a cache miss for an address occurs, and cache data D' for a given address is not available. In this case, the ATT 116 of FIG. 8A contains example entries of FIG. 8D. In an example of the invention, cache memory tags are derived directly from an input address, and the ATT is only accessed when a cache memory hit occurs to verify the cache entry is valid (corresponding to column 606 containing 1, or asserted, for a valid entry and 0, or unasserted, for a non-valid entry, and to search for preprocessed data D' in the accelerator second memory. Similarly a valid/invalid flag (column 607) is maintained for preprocessed data in the accelerator second memory along with a translated address A' for each matching address. A matching entry for the accelerator second memory (containing preprocessed data D') is given priority and accessed if it is available (the second memory address A' is present in column 610 and second memory valid bit is true in column 607, such as entry 614 of FIG. 8D), after which the preprocessed data is retrieved from second memory 128. If no matching entry for the tag is found in the ATT, then address A is given to first memory 126 which returns unprocessed data D, which is converted to preprocessed data D' and returned to the CPU.

In another example of an entry for the ATT, a range of addresses A may be mapped to a range of address A', such as entry 612, where each input address A in the range 0x100000 to 0x10FFFF is mapped to a corresponding address A' in the range 0x310000 to 0x31FFFF.

FIG. 9 shows a data write operation for the system of FIG. 8A, where preprocessed data D' accompanied by address A (shown as 902) is converted to unprocessed data D, and stored as unprocessed data D to address A in the accelerator first memory 126. Data D' is also passed by the controller to cache storage 120, where the data is updated if a cache tag hit occurs on path 906 or to accelerator memory 128 if ATT 116 translates it to hit in accelerator memory 128 on path 910. In the case of a cache and ATT miss, a new entry may also be created in the ATT and data D' stored in cache for further reuse from cache. This is not required, but can be done for performance reasons in the case of reuse. In another example of the invention demonstrated by the entries of ATT in FIG. 8D, the preprocessed data D' may be exclusively stored in either cache memory 120 or second memory 128, as indicated by a "1" in columns 606 or column 607 and a "0" in the corresponding other column. The example of FIG. 8B shows an example of the invention and is not intended to limit to only the configuration or exclusive manner of storage of preprogrammed data D' as shown.

The preprocessed data D' is typically not written to cache memory 120 other than as an update to an existing entry because of the read-centric cache policy previously described.

Figure 11:
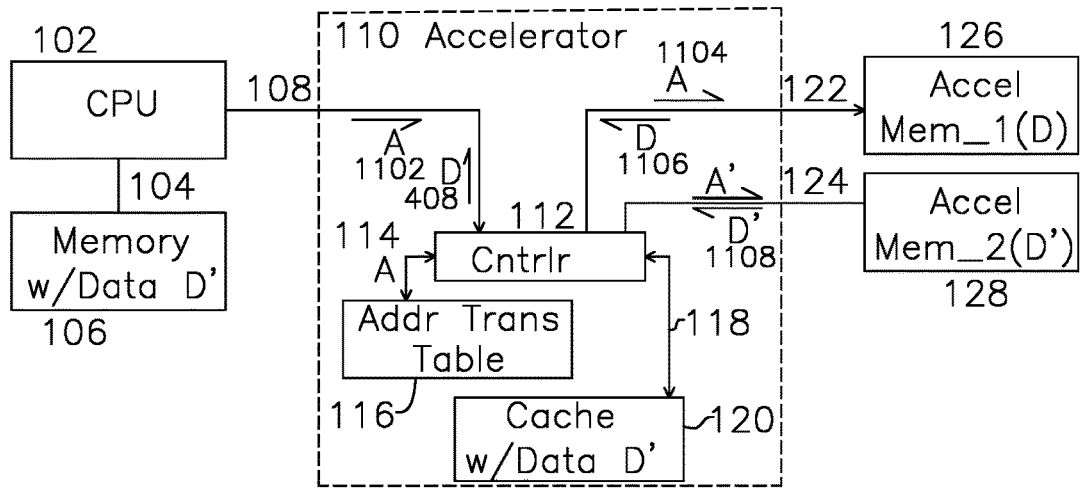
FIG. 11 shows an example read operation where the requested data is not in cache memory.

FIG. 10 shows a data read from cache memory 120, which operates directly to cache memory 120 as was described for FIG. 3. FIG. 11 shows the case where the data is not in cache but the ATT contains an address entry A' for accelerator second memory 128. The incoming read request from interface 108 with address A 1102 is directed to controller 112, and for an address match in the ATT, a request for preprocessed data D' in the second memory 128 translated address A' results in retrieval of preprocessed data 1108 from the accelerator second memory 128 based on the ATT having a matching address entry A' and valid bit for second memory 128. Alternatively, if the ATT does not contain an entry for the input address A in ATT 116, the address A is provided to accelerator first memory 126, which returns unprocessed data D 1106 for conversion to preprocessed data D' by controller 112, and converted preprocessed data D' is returned to the CPU 102.

Figure 12:
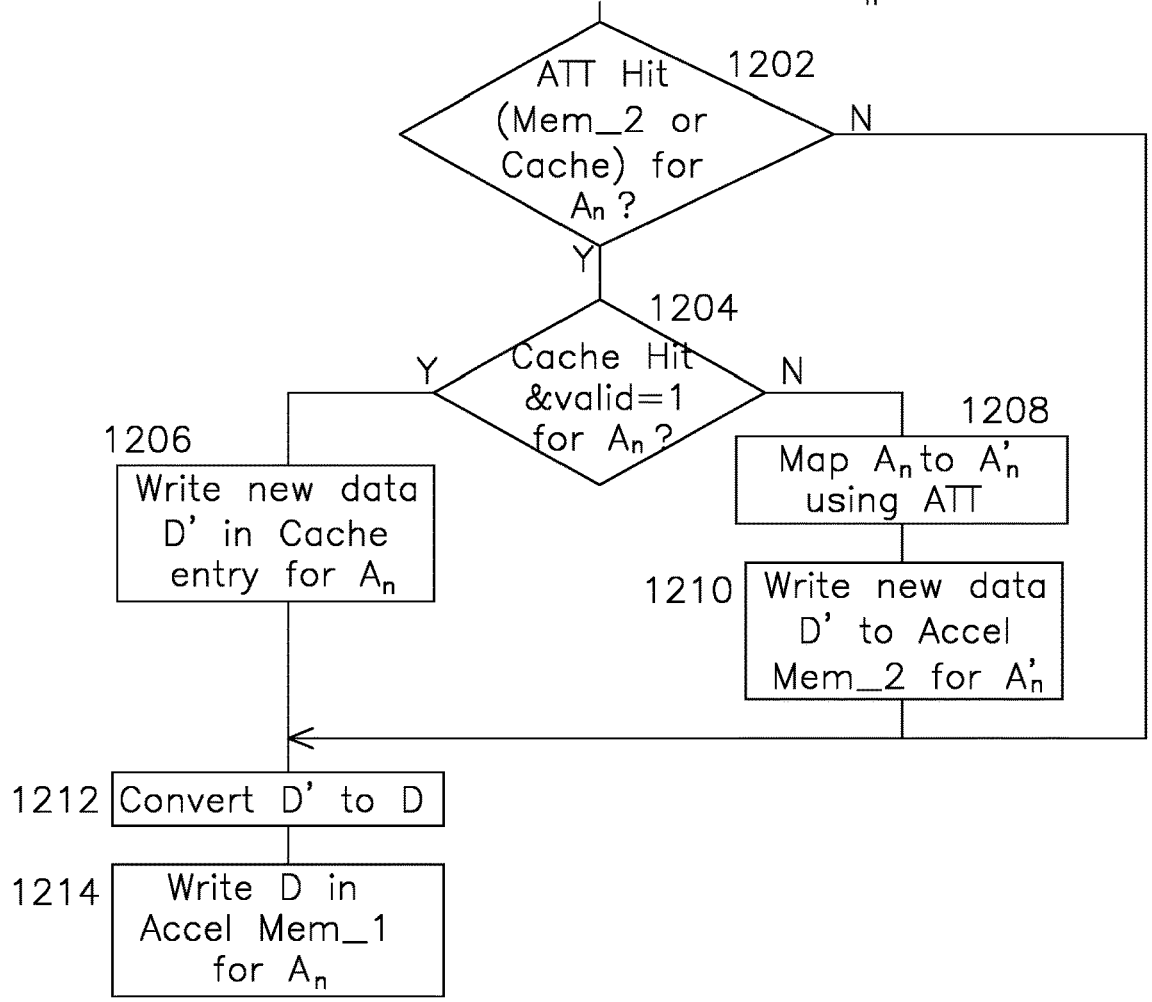
FIG. 12 shows an example flowchart for writing data in the system of FIG. 8A.

FIG. 12 shows an example flowchart for a write operation in the system of FIG. 8A, where the interface bus 108 contains a request for data D' to be written to address An. If a matching address entry in the ATT 116 is found 1202, or the data has been saved in cache memory 120, the cache memory 120 and/or accelerator second memory 128 are updated with the new data D' in step 1206, the preprocessed data D' is converted to unprocessed data D 1212, and unprocessed data D is saved into the accelerator first memory 126 using An' which is the address with a prefix or modifier added to reference the accelerator first memory 126. If there is no cache hit 1204, the incoming address An of the ATT entry indicates the address An' for the preprocessed data D' in the accelerator second memory 128, where the data D' is written, and optionally also added to cache memory. If no ATT entry with a valid bit is found 1202, the incoming preprocessed data D' is converted to unprocessed data D 1212 and written to the accelerator first memory 126.

FIG. 13 shows a flowchart for read operations using the system of FIG. 8A. If at step 1302, the incoming address An is found in the ATT table with a corresponding valid bit, and a cache hit 1304 for An is present, the data D' is read directly from Cache 1306 and returned to the CPU or requesting interface 1320. If a matching ATT entry for the address is found 1302 but the corresponding tag is not in cache in step 1304, then the ATT entry mapping An to An' is recovered 1308, and preprocessed data D' for address A' in accelerator second memory 128 is read in step 1310 and returned to the CPU in step 1320. If no ATT entry is found, the unprocessed data D is retrieved from accelerator first memory 126 for An in step 1312. The mapping from An to accelerator first memory 126 is a direct 1:1 mapping and so address translation of the ATT is not required for the address mapping. The retrieved unprocessed data D of step 1312 is converted into preprocessed data D' in step 1314, a new entry is made in the ATT mapping An to An', and the preprocessed data D' is stored in the cache, unless there is insufficient room, in which case the preprocessed data is stored in the accelerator second memory 128.

The present examples are provided for illustrative purposes only, and are not intended to limit the invention to only the embodiments shown.

We claim:

1. A storage system comprising:
a controller coupled to an interface and receiving read requests for preprocessed data D' from the interface;
the processed data D' comprising values converted from unprocessed data D to preprocessed data D' by a chip or FPGA controller and stored in an accelerator memory as unprocessed data D;
the controller also coupled to accelerator cache memory containing preprocessed data D' and also to the accelerator memory containing the unprocessed data D;
the accelerator memory having greater storage capacity than the accelerator cache memory;
the memory read requests comprising at least one address, the controller first examining the cache for a tag matching at least part of the at least one address and returning preprocessed data D' associated with the cache tag;
when a cache tag matching the address is not present, the controller subsequently examining the accelerator memory according to the input address and retrieving associated unprocessed data D;

the controller thereafter converting the retrieved unprocessed data D into preprocessed data D', and returning the preprocessed data D' to the interface.

2. The storage system of claim 1 where, when a matching address tag is not found in the cache memory, an entry corresponding to the preprocessed data is added to the cache memory.

3. The storage system of claim 1 where preprocessed data stored in the cache memory is the result of read operations for unprocessed data stored in the accelerator memory.

4. The storage system of claim 1 where preprocessed data derived from unprocessed data have a relationship of correspondence of preprocessed data to unprocessed data which is at least one of:
- a first number format to a second number format;
- a POSIT format to a different POSIT format;
- Java® code to machine opcode;
- compressed data to uncompressed data;
- compressed code to uncompressed code or
- a database with a first index to a database to a second index.

5. The storage system of claim 1 where the cache memory capacity is smaller than the accelerator memory capacity.

6. The storage system of claim 1 where the interface is at least one of a PCI (peripheral computer interface) interface, a PCIe interface, or a CXL (compute express link) interface.

7. The storage system of claim 1 where the cache is configured as at least one of: direct mapped cache, and n-way set associative cache, or a 2-way set associative cache.

8. A storage system comprising:
an accelerator first memory for unprocessed data D;
an accelerator second memory for preprocessed data D', the preprocessed data converted from unprocessed data D to preprocessed data D' by an energy-intensive data manipulation process, the unprocessed data D stored into the accelerator first memory, the accelerator first memory and accelerator second memory coupled to a controller;
the controller coupled to an interface and receiving read requests for preprocessed data from the CPU accompanied by a read address;
the controller also coupled to an accelerator cache memory containing preprocessed data and an associated tag derived from a read address;
the controller also coupled to an address translation table (ATT) having at least one entry, the at least one entry comprising an input address, an accelerator second memory translated address, and an accelerator second memory valid bit;
the read request comprising at least one input address;
the controller first examining the cache for a tag matching at least part of the input address and returning preprocessed data D' associated with the cache memory tag from the cache memory;
when a cache memory tag matching at least part of the address is not present in the cache memory and the input address matches an input address entry in the ATT for the accelerator second memory, the controller retrieving a translated address A' associated with the input address to the accelerator second memory, sending the translated address A' to the accelerator second memory, receiving preprocessed data D' from the accelerator second memory, and outputting the preprocessed data D' to the interface;

when a tag matching at least one part of the address is not present in either the cache or the ATT, the controller subsequently applying the input address to the accelerator first memory, retrieving associated unprocessed data D from the accelerator first memory, converting the unprocessed data to preprocessed data, and returning the preprocessed data to the interface.

9. The storage system of claim 8 where, when a matching address tag is not found in the cache memory, an entry corresponding to the preprocessed data is added to the cache memory.

10. The storage system of claim 8 where preprocessed data stored in the cache memory is the result of read operations for unprocessed data stored in the accelerator memory.

11. The storage system of claim 8 where preprocessed data derived from unprocessed data have a relationship of correspondence which is at least one of:
- a first number format to a second number format;
- a POSIT format to a different POSIT format;
- Java® code to machine opcode;
- uncompressed data to compressed data;
- uncompressed code to compressed code;
- compressed data to uncompressed data;
- compressed code to uncompressed code or
- a database with a first index to a database to a second index.

12. The storage system of claim 8 where the cache memory capacity is smaller than the accelerator memory capacity.

13. The storage system of claim 8 where the interface is at least one of a PCI (peripheral computer interface) interface, a PCIe interface, or a CXL (compute express link) interface.

14. The storage system of claim 8 where the cache is configured as at least one of: direct mapped cache, and n-way set associative cache, or a 2-way set associative cache.

15. The storage system of claim 8 where the accelerator first memory has greater storage capacity than the storage capacity of the cache memory.

16. The storage system of claim 8 where the accelerator first memory has greater storage capacity than the storage capacity of the second memory.

17. A process for retrieval of data in a storage system, the storage system comprising:
a controller receiving read requests for preprocessed data identified by a request address;
an accelerator first memory containing unprocessed data;
the preprocessed data having been converted from the unprocessed data by a chip or FPGA and stored in the accelerator first memory;
an address translation table (ATT) containing a plurality of entries, each entry comprising:
an input address
a cache valid bit indicating the presence of associated data in a cache memory, the cache memory containing preprocessed data;
an accelerator second memory valid bit indicating the presence of associated data in an accelerator second memory, the accelerator second memory containing preprocessed data;
the process comprising:
checking the ATT for a cache valid bit for the requested address and returning cache data corresponding to the request address when the cache valid bit is asserted;

when the cache valid bit is not asserted, checking the ATT for an accelerator second memory valid bit corresponding to the request address, and when the accelerator second memory valid bit is asserted, retrieving an associated modified address A' from the ATT and returning preprocessed data D' for the modified address A' from the accelerator second memory;

when the cache valid bit and the accelerator second memory valid bit of the ATT are not asserted for the requested address, retrieving unprocessed data D from the accelerator first memory, converting the unprocessed data D into preprocessed data D', and returning the preprocessed data D'.

18. The process of claim 17 where a relationship between unprocessed data to preprocessed data is at least one of:

a first number format to a second number format;
a POSIT format to a different POSIT format;
Java® code to machine opcode;
uncompressed data to compressed data;
uncompressed code to compressed code;
compressed data to uncompressed data;
compressed code to uncompressed code or
a database with a first index to a database to a second index.

19. The process of claim 17 where the cache memory has a storage capacity which is less than a storage capacity of the accelerator second memory, and a storage capacity of the accelerator second memory is less than a storage capacity of the accelerator first memory.

* * * * *